United States Patent [19]

Fennel, Jr. et al.

[11] 4,418,425
[45] Nov. 29, 1983

[54] ENCRYPTION USING DESTINATION ADDRESSES IN A TDMA SATELLITE COMMUNICATIONS NETWORK

[75] Inventors: John W. Fennel, Jr., Olney; Miles T. Heinz, Jr., Seabrook, both of Md.

[73] Assignee: IBM Corporation, Armonk, N.Y.

[21] Appl. No.: 297,607

[22] Filed: Aug. 31, 1981

[51] Int. Cl.³ .......................... H04K 1/00; H04J 3/16
[52] U.S. Cl. .............................. 455/27; 370/104; 375/2.2; 178/22.17
[58] Field of Search .......... 370/104; 375/2.1, 2.2; 455/26–30, 12; 178/22.15, 22.17

[56] References Cited

U.S. PATENT DOCUMENTS

| | | | |
|---|---|---|---|
| 3,798,359 | 3/1974 | Feistel | 178/22.15 |
| 4,135,059 | 1/1979 | Schmidt | 370/104 |
| 4,171,513 | 10/1979 | Otey et al. | 375/2.1 |
| 4,255,811 | 3/1981 | Adler | 375/2.1 |
| 4,262,356 | 4/1981 | Lautier et al. | 370/104 |
| 4,305,152 | 12/1981 | Asakawa et al. | 455/26 |
| 4,315,330 | 2/1982 | Brickman et al. | 370/104 |
| 4,319,353 | 3/1982 | Alvarez et al. | 455/12 |
| 4,322,576 | 3/1982 | Miller . | |
| 4,346,470 | 8/1982 | Alvarez et al. | 370/104 |
| 4,357,700 | 11/1982 | Alvarez et al. | 370/104 |

OTHER PUBLICATIONS

S 1792 0125, *Int. Conf. on Communications,* Denver, Co. (1/14–18/81), pp. 59.4–59.45, "Synchronization Techniques for Mobile Satellite Systems", Hagmann et al.
S 1792 011, *Int. Conf. on Comm.,* Denver, Co. (1/14–18/81), pp. 55.1–55.7, "SS/TDMA Frame Synchonization", Campanella et al.
S 0111 0016, Conf. on Electrncs & Aero. Syst., Wash. D.C. (10/69), "Results of TDMA Equip. Dev. Appl. to Military Systems", pp. 133–137 Epstein et al.

*Primary Examiner*—Sal Cangialosi
*Attorney, Agent, or Firm*—John E. Hoel

[57] ABSTRACT

An encryption system is disclosed which is based on channel destination addresses for a time division multiple access (TDMA) satellite communications network. A superframe initialization vector is transmitted from a master station to all other stations in the network. A plurality of frame initialization vectors is sequentially generated at each station in an encryption engine, from the superframe initialization vector, using a key which is common only to authorized users within the network. Each data channel is initialized with encryption bits produced by exclusive ORing the channel destination address and the frame initialization vector for the frame in which that channel is to be transmitted, and then passing the output of the exclusive OR through the encryption engine using either the same key or a second, different key. These encryption bits are combined with the channel data in an exclusive OR circuit for TDMA transmission via the satellite transponder to the receiving stations. The decryption process at the receiving stations parallels the encryption process at the transmitting stations, so that clear-text data is output only at the destination addressed where the intended recipient has the same key as the transmitter. The system enables the synchronization of encryption engines at separate, geographically remote stations and permits the decryption of encrypted channels at anytime within a TDMA frame.

6 Claims, 6 Drawing Figures

ENCRYPTION USING DESTINATION ADDRESSES IN A TDMA SATELLITE COMMUNICATIONS NETWORK

FIELD OF THE INVENTION

The invention disclosed broadly relates to communications and more particularly relates to an encryption technique for a time division multiple access satellite communications network.

BACKGROUND OF THE INVENTION

A time domain multiple access (TDMA) satellite communications controller, such as that described by Alvarez, et al. in the copending U.S. patent application entitled "Time Domain Multiple Access Broadcasting, Multipoint and Conferencing Communication Apparatus and Method," Ser. No. 130,498, filed Mar. 14, 1980, assigned to the instant assignee, and incorporated herein by reference, has a format which can be seen in FIG. 1. A TDMA frame is 15 milliseconds long, consisting of a control field and a traffic field. The traffic field contains approximately 1400 channels, each headed by a destination address field of 32 bits followed by a data field of 480 bits. There are 20 TDMA frames in a superframe group. The destination address specifies the destination satellite communications controller (SCC) and the address in the receive burst buffer (RBB) used by the destination SCC to store the data being transmitted. When transmitting encrypted data, a problem arises in such a TDMA system in coordinating the encryption and decryption engines in the respective earth stations since there is typically a 300 millisecond delay between the transmission of the encrypted data from a transmitting station and the reception and decryption of that data at a receiving station. Some means must be provided to coordinate the encryption and decryption engines and still further, to enable a channel of information to be decrypted at any time within a TDMA frame.

OBJECTS OF THE INVENTION

It is therefore an object of the invention to provide an improved TDMA communications system encryption and decryption technique.

It is still a further object of the invention to enable the encrypted data stream in a TDMA communications system to be decrypted at any time within a TDMA frame.

SUMMARY OF THE INVENTION

These and other objects, features and advantages of the invention are accomplished by the apparatus and method disclosed herein. An encryption system is disclosed which is based on channel destination addresses for a time division multiple access (TDMA) satellite communications network. A superframe initialization vector is transmitted from a master station to all other stations in the network. A plurality of frame initialization vectors is sequentially generated at each station in an encryption engine, from the superframe initialization vector, using a key which is common only to authorized users within the network. Each data channel is initialized with encryption bits produced by exclusive ORing the channel destination address and the frame initialization vector for the frame in which that channel is to be transmitted, and then passing the output of the exclusive OR through the encryption engine using either the same key or a second, different key. These encryption bits are combined with the channel data in an exclusive OR circuit for TDMA transmission via the satellite transponder to the receiving stations. The decryption process at the receiving stations parallels the encryption process at the transmitting stations, so that clear-text data is output only at the destination addressed where the intended recipient has the same key as the transmitter. The system enables the synchronization of encryption engines at separate, geographically remote stations and permits the decryption of encrypted channels at any time within a TDMA frame.

DESCRIPTION OF THE FIGURES

These and other objects, features and advantages of the invention will be more fully appreciated with reference to the accompanying figures.

DISCUSSION OF THE PREFERRED EMBODIMENT

An apparatus and method are disclosed for the encryption of a TDMA data stream based upon destination channel addresses. The technique makes it possible to produce encryption bits at a rate much slower than that of presently existing methods. The technique is compatible with both single transponder and multitransponder satellite communications controller configurations. Elements of the satellite communications controller (SCC 22) disclosed in the above-referenced Alvarez, et al. copending patent application, will be referred to herein by the same names and reference numbers, which have values less than 400.

Figure 1:
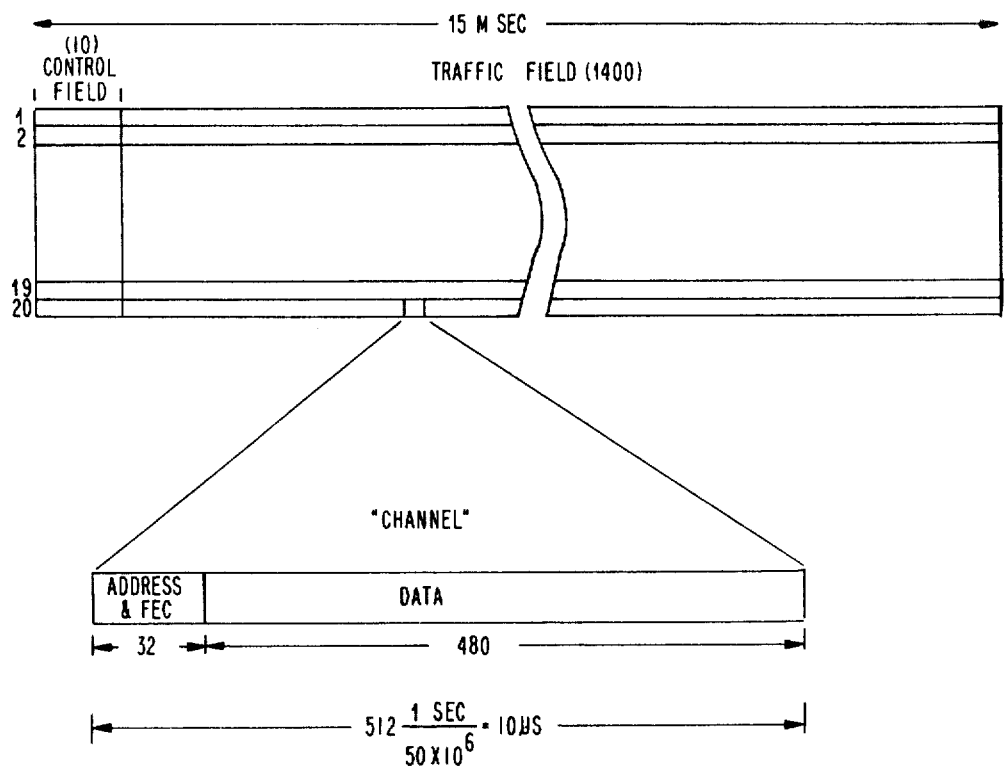
FIG. 1 is a timing diagram of the TDMA frame structure for a satellite communications controller.

The TDMA frame structure of the SCC 22 is shown in FIG. 1. The frame is 15 milliseconds long, consisting of a control field and a traffic field. The traffic field contains approximately 1400 channels, each of which is headed by a destination address field of 32 bits and a data field of 480 bits. There are 20 frames in a superframe group. The destination address specifies the destination SCC 22 and the location in the RBB 64 used by the destination SCC to store the data.

Figure 2:
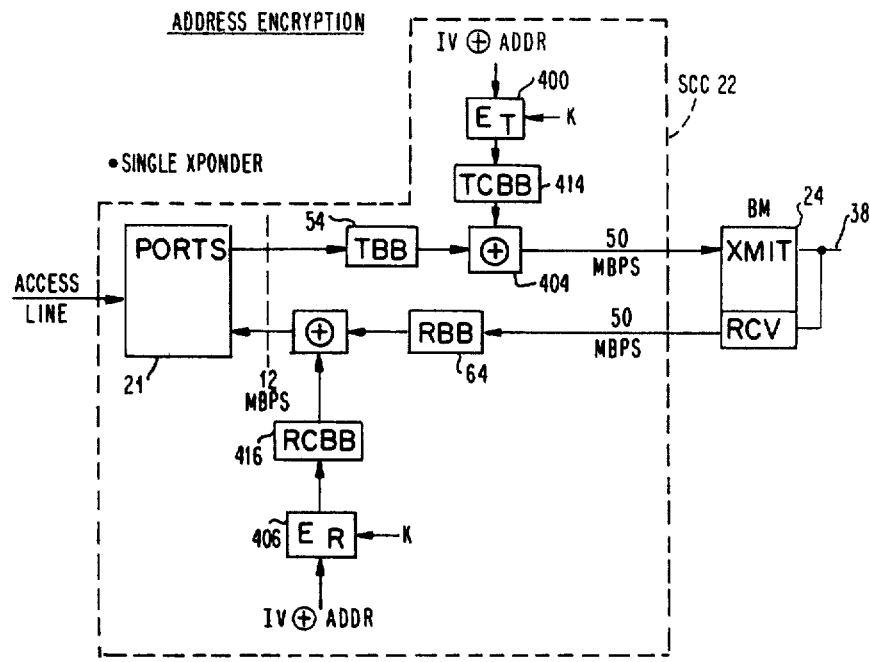
FIG. 2 is a functional block diagram of the encryption and decryption portions of the invention for a single transponder network.
Figure 3:
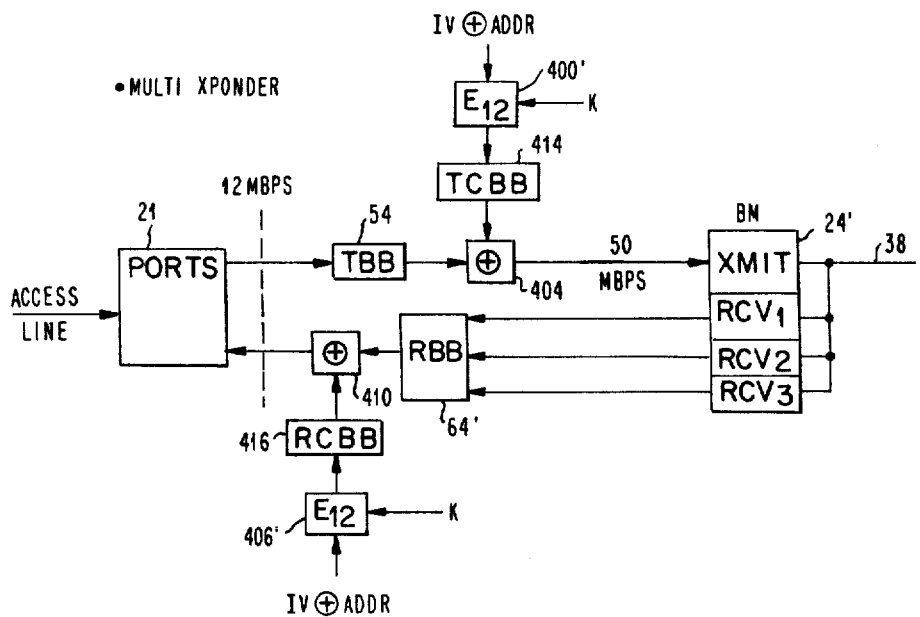
FIG. 3 is a functional block diagram of the encryption and decryption portions of the invention for a multitransponder network.

A functional block diagram of the encryption system, for a single transponder, is shown in FIG. 2. The principle is the same for multitransponder operation as is shown in FIG. 3, where like elements are similarly numbered. The encryption engine 400 produces encryption bits for every channel which that SCC can transmit during one TDMA frame. The encryption bits are produced one frame early from a frane initialization vector and the destination address for the data, and stored in one-half of the A/B-type transmit crypto bit buffer 414 (TCBB) during the same frame that the data bits are being loaded into one-half of the A/B-type transmit burst buffer (TBB) 54, as described in the above-referenced Alvarez, et al. application. Both the TDBB 414 and the TBB 54 are controlled in the same way by the switch control memory (SCM) 50 described by Alvarez, et al. As the 480 bit channels of data are read out of the transmit burst buffer (TBB) 54 during the next transmit frame, the corresponding 480 encryption bits are read out of the TCBB 414 and exclusive OR'ed in the exclusive OR 404 with the data. The result is sent to the burst modem 24 and then to the satellite transponder.

When encrypted data is received at the SCC 22 from the satellite transponder during a receive frame, it is loaded into one-half of the A/B-type receive burst buffer (RBB) 64 and an encryption engine 406 produces encryption bits from the frame initialization vector and the destination address, which are stored in a receive crypto bit buffer (RCBB) 416. Both the RCBB 416 and the RBB 64 are controlled in the same way by the SCM 50. As bytes are read from the receive burst buffer (RBB) 64 for the port 21 during the next receive frame, the corresponding bytes of encryption bits are read from the RCBB 416 and exclusive OR'ed in the exclusive OR 410 to yield clear data for the port 21. Encryption bits can be produced by any suitable encryption engine such as the data encryption standard (DES) engine disclosed in U.S. Pat. No. 3,798,351 by Feistel. Encryption bits are produced as follows. The synchronization vector (SV), is generated by the superframe initialization vector generator 460 of FIG. 4 and transmitted once per superframe by the gate 462 at superframe start time in the SCC at the reference station 3 to all other SCC's in the network. These synchronization vectors are transmitted several superframe intervals before they will be effective, and are stored at each receiving station until used. Then each station will have had time to receive the correct synchronization vector before the superframe occurs in which it is to be used. This is similar to the transmission of channel assignments from a master reference station, as is described in the copending U.S. patent application by Alvarez and Shabe, Ser. No. 132,708 filed Mar. 21, 1980, entitled "Initial Acquisition of Synchronization in a TDMA Satellite Communications System."

Using the network key $K_1$, an encryption engine 400 produces the first frame initialization vector $IV_1$ ($FIV_1$) from the synchronization vector SV which is effective for the present superframe. This can be expressed symbolically as:

$$(SV, K_1)E \rightarrow FIV_1$$

In the next frame of the present superframe, the second initialization vector $FIV_2$ is produced, etc., up to the initialization vector in the 20th frame, $FIV_{20}$. This can be expressed symbolically as:

$$(FIV_1, K_1)E \rightarrow FIV_2$$
$$\vdots$$
$$(FIV_{19}, K_1)E \rightarrow FIV_{20}$$

To produce encryption bits for a particular channel, the destination address of that channel is exclusive OR'ed with that frame's IV and encrypted under key $K_2$. This can be expressed symbolically as:

$$(\text{Destination address} \cdot \text{exclusive OR} \cdot FIV_n, K_2)E \rightarrow \text{encryption bits for channel (480 bits)}.$$

The encryption engine is initialized in this manner to produce encryption bits for every channel that the SCC can transmit or receive during a particular TDMA frame. As shown in FIG. 3, this solution is sufficient to handle a multiple transponder system where each SCC transmits traffic at one transponder frequency and receives traffic on several transponder frequencies. As is seen in FIG. 3, the burst modem 24' is equipped with three receive portions RCB1, RCB2, and RCB3 to accommodate three received frequencies, and the received data is merged in the RBB 64' before being applied to the exclusive OR 410, in a manner similar to that described for FIG. 2.

Figure 4:
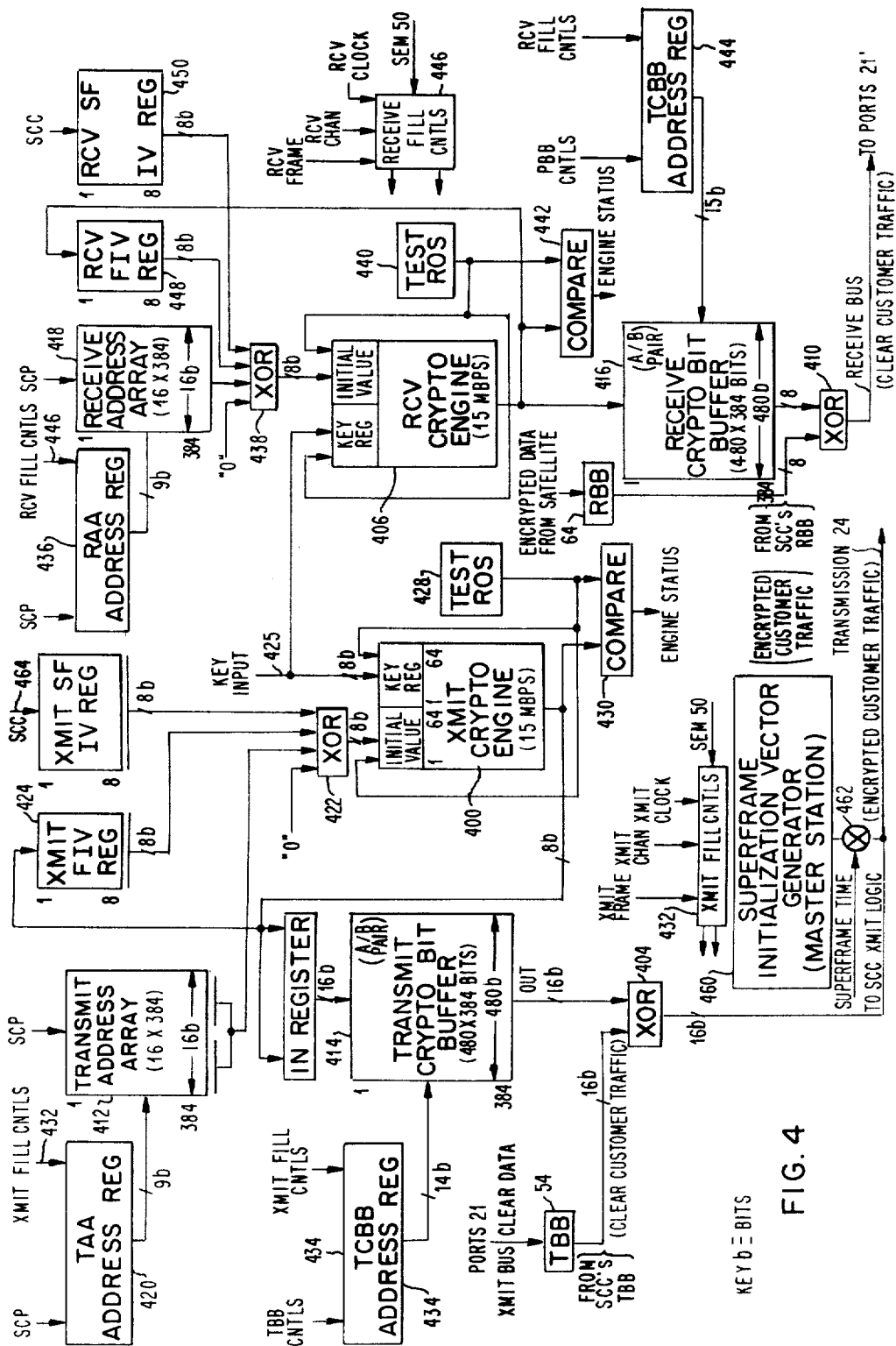
FIG. 4 is a more detailed illustration of the encryption and decryption portions of the invention for a single transponder network.

A more detailed illustration of the encryption and decryption circuitry for the invention is shown in FIG. 4. The transmit address array 412 is a 16 by 384 bit random access memory which is written into by the satellite communications processor (SCP) 32 and which is read out of under control of the transmit fill controls 432 which is input via the transmit address array (TAA) address register 420. The contents of the TAA 412 is output to the exclusive OR 420 which supplies an initial value from the transmit crypto engine 400. The address is exclusive OR'ed in the exclusive OR 422 with the first 16 bits of the frame initialization vector FIV from the register 424, and is loaded into the encryption engine 400, followed by the loading of the remaining 48 bits of the frame initialization vector FIV so as to initialize the encryption engine to produce 480 encryption bits. The engine produces 64 encryption bits each cycle, which are loaded into the transmit crypto bit buffer (TCBB) 414, which is a 480 by 384 bit buffer. This loading is performed 16 bits per cycle under the control of the transmit fill control 432 which is applied to the TCBB address register 434.

After a fill frame, the bits in the TCBB 414 are read out in parallel with the data bits in the TBB 54 and corresponding bits are exclusive OR'ed in the exclusive OR 404 with the output of the TBB 54 and then transmitted via the burst modem to the satellite transponder as the encrypted user traffic.

The transmit crypto engine 400 produces a frame initialization vector each transmit frame. The first frame initialization vector, $FIV_1$ is the product of the transmit superframe initialization vector (SXFIV) which is stored in the transmit SFIV register 426, and the user key input on line 425. The resultant frame initialization vector is held in the FIV register 424, which is an eight-by-eight bit random access memory, and used for the encryption bit production during frame 1, as previously described. During subsequent TDMA frames of that superframe, frame initialization vectors $FIV_n$ are encrypted with the key to yield next frame initialization vectors $FIV_{n+1}$. Every superframe the SCC 22 provides a new SXFIV to the register 426. The user's key, KEY, is a static but changeable, 56 bit variable (shown as 64 bits to include parity bits) which can be controlled externally to the SCC 22. The receive crypto bit buffer (RCBB) 416 is similar to the TCBB 414 both in operation and in design. The RCBB is filled during the receive frames, with logic control signals coming from the receive fill controls 446 via the receive address array (RAA) address register 436. The RAA address register 436 provides an address input to the receive address array (RAA) 418, which in turn has an output connected to the exclusive OR 438. The RCBB 416 is read out simultaneously with the RBB 64. Both the receive frame initialization vector input via the register 448 and the receive superframe initialization vector received via the register 450, are kept separate from the transmit operations because of the differences in the receive and transmit frame timing. Overall, the receive side operation for decryption is very similar to the transmit side operation for encryption, as has been previously described.

OPERATION OF THE INVENTION

Figure 5:
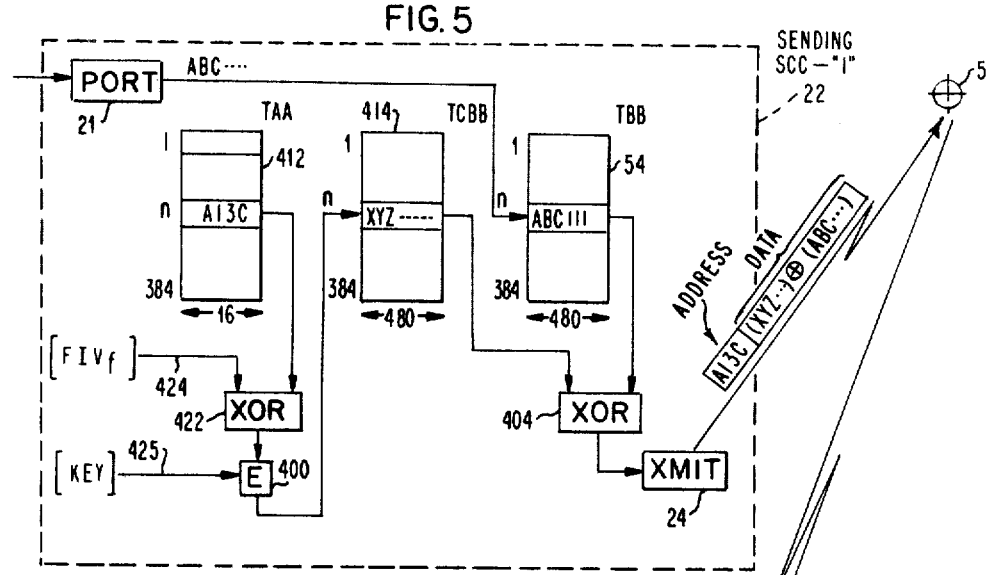
FIG. 5 is a data flow diagram illustrating the operation of the invention for a single transponder network.
Figure 5:
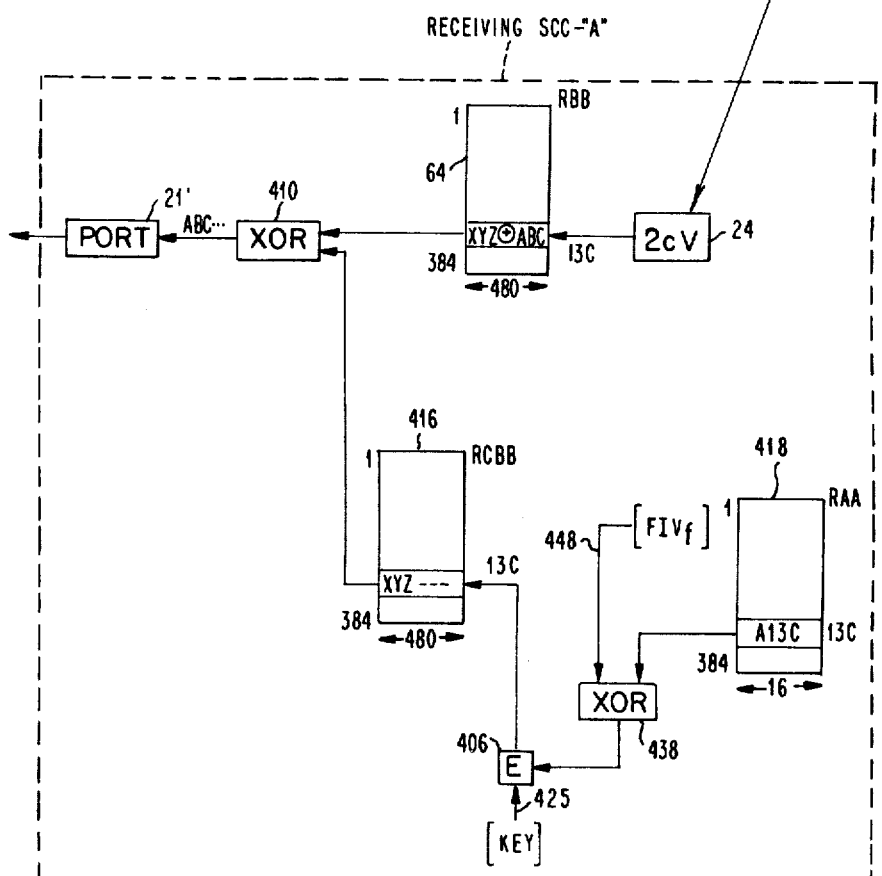

An illustration of the operation of the invention can be seen in FIG. 5 which shows how the user's traffic is encrypted and transmitted from a transmitting station to a receiving station via the satellite transponder 5. Only traffic in one direction is shown. For purposes of illustration, assume a call is placed, originating at the SCC-1 (22) to a user connected at the SCC-A (22'). During the call set-up (achieved with signaling messages between the two SCC's) the receiving SCC-A (22') assigns the RBB 64 location value 13C to the call and the sending SCC1 (22) assigns the TBB 54 location value n. Within the transmitting SCC-1 (22) the location value n of the transmit address array (TAA) 412 is loaded with the value A13C, the destination address of the outgoing traffic channel. Within the receiving SCC-A (22') the location value 13C of the receive address array (RAA) 418 is loaded with the address value A13C.

During each TDMA frame, the sending port 21 supplies the TBB 54 location value n with 480 data bits to be transmitted, for the frame under discussion that text is labeled ABC.... To prepare the crypto bits, the location value n of the TAA 412 (containing the destination address value A13C) is exclusive OR'ed in the exclusive OR 422 with the frame initialization vector $FIV_f$. The result is encrypted with the KEY in the encryption engine 400 to produce 480 crypto bits (labeled XYZ ... ) which are loaded into the transmit crypto bit buffer (TCBB) 414 location value n during the same interval that the corresponding data bits are loaded into the TBB 54. When this traffic ABC ... is transmitted during the next frame, the locations n of the TBB 54 and the TCBB 414 are read out simultaneously and exclusive OR'ed in the exclusive OR 404 so as to yield the actual transmitted encrypted data ((XYZ ... ) exclusive OR (ABC ... )). The destination address value A13C is applied as the channel address as in normal SCC operation.

This channel of encrypted data is received by the SCC-A (22') and is loaded into the receive burst buffer (RBB) 64 location value 13C, in its encrypted form. The bits for decryption have been prepared using the contents of the receive address array (RAA) 418 location value 13C (A13C) which are exclusive OR'ed in the exclusive OR 438 with the frame initialization vector $FIV_f$ and then encrypted with the KEY in the encryption engine 406, and loaded into the receive crypto bit buffer (RCBB) 416 location value 13C. Data from the RBB 64 and the RCBB 416 locations 13C are selected simultaneously, exclusive OR'ed in the exclusive OR 410, and yield the clear data ABC ... which is the original text which is directed to the receiving port 21'.

Figure 6:
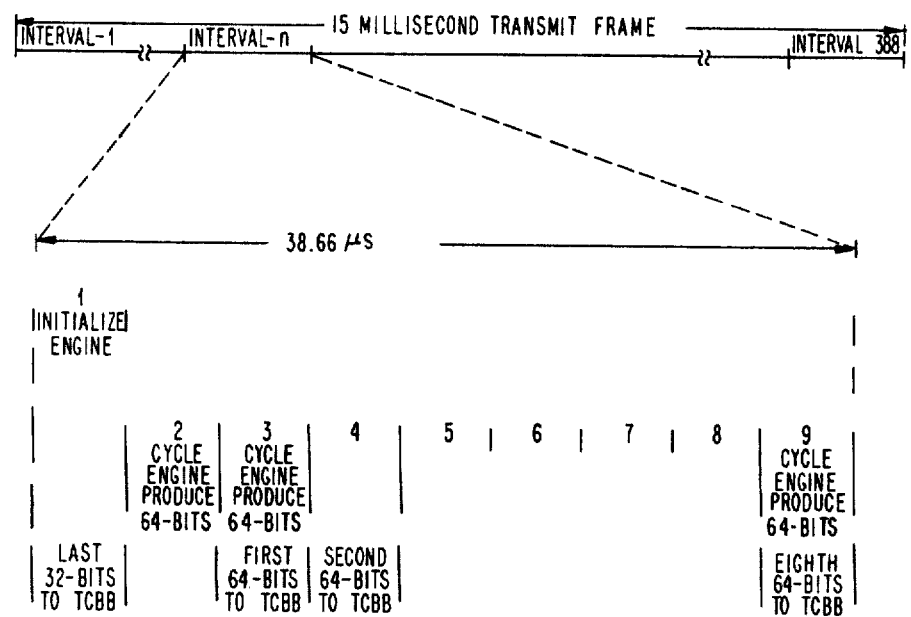
FIG. 6 is a timing diagram illustrating the operation of the encryption and decryption engines.

The timing for this operation in a typical TDMA frame (either transmit or receive) is shown in FIG. 6. The 15 millisecond frame is shown broken into 388 intervals of 38.66 microseconds each. Each interval is long enough to initialize the encryption engine 400 and cycle it eight times to produce the eight times 64 bits (only 480 are used) for a given partition in the TCBB 414. Allowing one cycle for engine initialization and readout, there are a total of nine cycles per 38.66 microsecond interval. The required engine speed is then greater than or equal to 14.9 Mbps.

It should be noted that if the encryption engine had to encrypt the data at the TDMA burst rate, instead of spreading its encryption operation over a larger portion of each frame as in the subject invention, its required speed would have to be many times the 15 Mbps rate for the present design.

Cycle 1 is used to initialize the engine 400 and read out the 32 encryption bits produced in the last cycle of the previous interval. During cycles 2 through 9, the engine 400 produces 64 crypto bits. Note that the bits are unloaded from the previous cycle while while the next 64 bits are being produced.

Intervals 1 through 4 are used for producing the frame initialization vector $FIV_n$. This requires two cycles during interval 1. The remaining cycles are used to run test patterns on the encryption engine 400. Two 64-bit numbers are read from the test ROS 428 shown in FIG. 4, and the encryption engine 400 is cycled several times. The output value is compared to a third 64-bit value in the test ROS 428 and if those values are equal, the engine 400 is assumed to be functioning properly.

DETAILED DESCRIPTION OF THE PREFERRED EMBODIMENT

The invention finds particular application in a TDMA satellite communications network having a master station and a plurality of subsidiary earth stations, each communicating through a satellite transponder 5 in a plurality of TDMA frames grouped into superframes, each frame having a control portion and a traffic portion. Each station includes a TDMA communications controller 22 having a plurality of input/output ports 21 for transferring $n_i$ channels of m data units each per TDMA frame from respective, local data users to a TDMA output 24 to the satellite transponder 5 and transferring $n_i$ of the channels of data via a TDMA input 24 from the satellite transponder 5 to the respective local users on a time interleaved basis during periodic TDMA frames, each port 21 operating at its own data rate $R_i$. The encryption/decryption system for the network, includes a superframe initialization vector generator 460 in the master station, having an output connected to the TDMA output 24 thereof, for transmitting a superframe synchronization vector SV once during each transmit superframe. The vector SV for an $n^{th}$ transmit superframe will be transmitted in the prior $n-2^{th}$ transmit superframe.

For encrypting data to be transmitted, via the TDMA satellite link, the system further includes a first encryption engine 400 in each of the stations, having an input 464 connected to the TDMA input 24 thereof, for receiving the superframe synchronization vector SV and encrypting it with a key $K_1$, forming a first frame initialization vector $FIV_1$ prior to a first transmit frame $F_{T1}$ of a transmit superframe, to be used for the first transmit frame $T_{T1}$.

For the encrypting for transmission, the system further includes a frame initialization vector buffer 424 in each of the stations, having an input connected to the first encryption engine 400, for storing frame initialization vectors output therefrom.

The system further includes a transmit address array buffer 412 in each of the stations, for storing a plurality of destination addresses, each repectively corresponding to each of the plurality of channels of data to be transmitted.

For encrypting for transmission, the system further includes a first exclusive-OR circuit 422 in each of the stations, having a first input connected to the frame initialization vector buffer 424 and a second input connected to the transmit address array buffer 412, and an output connected to the input of the first encryption engine 400, for generating a plurality of channel units of exclusive OR bits from the said first initialization vector $FIV_1$ and the plurality of destination addresses, each unit corresponding to each of the channels of data to be transmitted. The first encryption engine 400 receives each of the plurality of channel units of exclusive OR bits and encrypts it with a key, forming a corresponding plurality of channel units of encryption bits. The key can remain the same $K_1$ as was previously used to generate $FIV_1$. However, to further enhance the encryption, a different key $K_2$ can be used at this stage. But, to simplify the description here, the same key $K_1$ will be used throughout.

The system further includes a transmit crypto bit buffer 414 in each of the stations, having an alternate A/B storage cycle, with an input connected to the output of said first encryption engine 400, and an output, for storing the plurality of channel units of encryption bits on a first or A side during the transmit frame immediately preceding the first transmit frame $F_{T1}$.

For encrypting for transmission, the system further includes a second exclusive-OR circuit 404 in each of the stations, having a first input connected to the output of the transmit crypto bit buffer 414 and an outpuyt connected to the TDMA output 24. A transmit burst buffer 54 in each of the stations has an alternate A/B storage cycle, with a data input connected to a transmit bus common to the data outputs of all of the ports 21 and an output connected to a second input of the second exclusive-OR circuit 404, for storing, in clear-text form, the plurality of channels of data on a first or A side during the transmit frame immediately preceding the first transmit frame $F_{T1}$.

The transmit burst buffer 54 bursts the plurality of clear-text data channels from the first or A side thereof during the first transmit frame $F_{T1}$, to the second input of the second exclusive-OR circuit 404 synchronously with the transmit crypto bit buffer 414 bursting the plurality of channel units of encryption bits from the first or A side thereof to the first input of the second exclusive-OR circuit 404. The second exclusive-OR circuit then outputs to the TDMA output 24 a resultant plurality of encrypted data channels, each of which is transmitted to the satellite transponder 5 with a corresponding destination address.

During the first transmit frame $F_{T1}$, the first encryption engine 400 directly encrypts the first frame initialization vector $FIV_1$ with a key $K_1$, forming a second frame initialization vector $FIV_2$ to be used for an immediately succeeding second transmit frame $F_{T2}$. The first exclusive-OR circuit 422 generates a second plurality of channel units of exclusive OR bits during the first transmit frame $F_{T1}$, from the second frame initialization vector $FIV_2$ and the plurality of destination addresses stored in the transmit address array buffer 412. The first encryption engine 400 encrypts the second plurality of channel units of exclusive OR bits with a key $K_1$, forming a second plurality of channel units of encryption bits during the first transmit frame $F_{T1}$. The transmit crypto bit buffer 414 stores the second plurality of channel units of encryption bits on a second or B side thereof during the first transmit frame $F_{T1}$. The transmit burst buffer 54 stores a second plurality of channels of data on a second or B side thereof during the first transmit frame $F_{T1}$.

During the second transmit frame $F_{T2}$ which immediately follows the first transmit frame $F_{T1}$, the transmit burst buffer 54 bursts the second plurality of data channels from the second or B side thereof to the second exclusive-OR circuit 404 synchronously with the transmit crypto bit buffer 414 bursting the second plurality of channel units of encryption bits from the second or B side thereof to the second exclusive-OR circuit 404. The second exclusive-OR circuit 404 outputs to the TDMA output 24 a resultant second plurality of encrypted data channels, each of which is transmitted to the satellite transponder 5 with a corresponding destination address.

During an $n^{th}$ transmit frame $F_{Tn}$, the first encryption engine 400 directly encrypts an $n^{th}$ frame initialization vector $FIV_n$ with a key $K_1$, forming an $n+1^{th}$ frame initialization vector $FIV_{n+1}$ to be used for an immediately succeeding $n+1^{th}$ transmit frame $F_{Tn+1}$. The first exclusive-OR circuit 422 generates an $n+1^{th}$ plurality of channel units of exclusive OR bits during the $n^{th}$ transmit frame $F_{Tn}$, from the $n+1^{th}$ frame initialization vector $FIV_{n+1}$ and the plurality of destination addresses stored in the transmit address array buffer 412. The first encryption engine 400 encrypts the $n+1^{th}$ plurality of channel units of exclusive OR bits with a key $K_1$, forming an $n+1^{th}$ plurality of channel units of encryption bits during the $n^{th}$ transmit frame $F_{Tn}$. The transmit crypto bit buffer 414 stores the $n+1^{th}$ plurality of channel units of encryption bits on one of the sides thereof during the $n^{th}$ transmit frame $F_{Tn}$. The transmit burst buffer 54 stores an $n+1^{th}$ plurality of channels of data on a corresponding one of the sides thereof during the $n^{th}$ transmit frame $F_{Tn}$.

During the $n+1^{th}$ transmit frame $F_{Tn+1}$ which immediately follows the $n^{th}$ transmit frame $F_{Tn}$, the transmit burst buffer 54 bursts the $n+1^{th}$ plurality of data channels from the one side thereof to the second exclusive-OR circuit 404 synchronously with the transmit crypto bit buffer 414 bursting the $n+1^{th}$ plurality of channel units of encryption bits from the corresponding one side thereof to the second exclusive-OR circuit 404. The second exclusive-OR circuit 404 outputs to the TDMA output 24 a resultant $n+1^{th}$ plurality of encrypted data channels, each of which is transmitted to the satellite transponder 5 with a corresponding destination address.

The transmission of control information and data from a transmitting station to a receiving station via a geosynchronous satellite transponder can take up to 300 milliseconds. Thus the receive timing at a station is offset from the transmit timing at that station, as is well known in the art. The terms "receive superframe" and "receive frame" are used for superframes and frames which are referenced with respect to the receiving timing at a station. This is distinguished from "transmit superframes" and "transmit frames" which are referenced with respect to the TDMA transmit timing at a station.

For decrypting the encrypted data received from the TDMA satellite, the system further includes a second encryption engine 406 in each of the stations, having an input connected to the TDMA input 24 thereof, for receiving the superframe synchronization vector SV and encrypting it with a key K, forming the first frame initialization vector $FIV_1$ prior to a first receive frame $F_{R1}$ of a receive superframe, to be used for the first receive frame $F_{R1}$.

For decryption in reception, the system further includes a receive frame initialization vector buffer 448 in each of the stations, having an input connected to the second encryption engine 406, for storing frame initialization vectors output therefrom.

The system further includes a receive address array buffer 418 in each of the stations, for storing a plurality of receive destination addresses, each respectively corresponding to each of a plurality of channels of data to be received from the satellite transponder 5.

For decryption in reception, the system further includes a third exclusive-OR circuit 438 in each of the stations, having a first input connected to the receive frame initialization vector buffer 448 and a second input connected to receive address array buffer 418, and an output connected to the input of the second encryption engine 406, for generating a plurality of receive channel units of exclusive OR bits from the first frame initialization vector $FIV_1$ and the plurality of receive destination addresses, each receive unit corresponding to each of the channels of data to be received from the satellite transponder 5. The second encryption engine 406 receives each of the plurality of receive channel units of exclusive OR bits and encrypts it with a key $K_1$, forming a corresponding plurality of receive channel units of encryption bits. If a different key $K_2$ were used for encrypting the channel units of exclusive OR bits at the transmitting station, then that key $K_2$ would have to be used at the receiving station at this stage. To simplify the description here, however, the same key $K_1$ will be used throughout.

The system further includes a receive crypto bit buffer 416 in each of the stations, having an alternate A/B storage cycle, with an input connected to the output of the second encryption engine 406, and an output, for storing the plurality of receive channel units of encryption bits on a first or A side at locations specified by the corresponding destination address, during the receive frame immediately preceding the first receive frame $F_{R1}$. The destination addresses at a receiving station are established for an $n^{th}$ receive superframe, by channel assignments made in the prior $n-2^{th}$ receive superframe.

For decryption in reception, the system further includes a fourth exclusive-OR circuit 410 in each of the stations, has a first input connected to the output of the receive crypto bit buffer 416 and an output connected to a receive bus common to the data inputs of all of the ports 21. A receive burst buffer 64 in each of the stations has an alternate A/B storage cycle, with a data input connected to the TDMA input 24 and an output connected to a second input of the fourth exclusive-OR circuit 410, for storing the resultant plurality of encrypted data channels received from the satellite transponder 5, on a first or A side thereof at locations specified by the corresponding destination address, during the receive frame immediately preceding the first receive frame $F_{R1}$.

The receive burst buffer 64 outputs the resultant plurality of encrypted data channels from the first or A side thereof during the first receive frame $F_{R1}$, to second input of the fourth exclusive-OR circuit 410 synchronously with the receive crypto bit buffer 416 outputting the plurality of receive channel units of encryption bits from the first or A side thereof to the first input of the fourth exclusive-OR circuit 410. The fourth exclusive-OR circuit 410 then outputs to the receive bus, the plurality of clear-text channels of data during the first receive frame $F_{R1}$.

During the first receive frame $F_{R1}$, the second encryption engine 406 directly encrypts the first frame initialization vector $FIV_1$ with a key $K_1$, forming a second frame initialization vector $FIV_2$ to be used for an immediately succeeding second receive frame $F_{R2}$. The third exclusive-OR circuit 438 generates a second plurality of receive channel units of exclusive OR bits during the first receive frame $F_{R1}$, from the second frame initialization vector $FIV_2$ and the plurality of receive destination addresses stored in the receive address array buffer 418. The second encryption engine 406 encrypts the second plurality of receive channel units of exclusive OR bits with a key $K_1$, forming a second plurality of receive channel units of encryption bits during the first receive frame $F_{R1}$. The receive crypto bit buffer 416 stores the second plurality of receive channel units of encryption bits on a second or B side thereof during the first receive frame $F_{R1}$. The receive burst buffer 64 stores a second resultant plurality of encrypted data channels on a second or B side thereof during the first receive frame $F_{R1}$.

During the second receive frame $F_{R2}$ which immediately follows the first receive frame $F_{R1}$, the receive burst buffer 64 outputs the second resultant plurality of encrypted data channels from the second or B side thereof to the fourth exclusive-OR circuit 40 synchronously with the receive crypto bit buffer 416 outputting the second plurality of receive channel units of encryption bits from the second or B side thereof to the fourth exclusive-OR circuit 410. The fourth exclusive-OR circuit 410 then outputs to the receive bus a second plurality of clear-text channels of data during the second receive frame $F_{R2}$.

During the $n^{th}$ receive frame $F_{Rn}$, the second encryption engine 406 directly encrypts the $n^{th}$ frame initialization vector $FIV_n$ with a key $K_1$, forming an $n+1^{th}$ frame initialization vector $FIV_{n+1}$ to be used for an immediately succeeding $n+1^{th}$ receive frame $F_{Rn+1}$. The third exclusive-OR circuit 438 generates an $n+1^{th}$ plurality of receive channel units of exclusive OR bits during the $n^{th}$ receive frame $F_{Rn}$, from the $n+1^{th}$ frame initialization vector $FIV_{n+1}$ and the plurality of receive destination addresses. The second encryption engine 406 encrypts the $n+1^{th}$ plurality of receive channel units of exclusive OR bits with a key $K_1$, forming an $n+1^{th}$ plurality of receive channel units of encryption bits during the $n^{th}$ receive frame $F_{Rn}$. The receive crypto bit buffer 416 stores the $n+1^{th}$ plurality of receive channel units of encryption bits on one of the sides thereof during the $n^{th}$ receive frame $F_{Rn}$. The receive burst buffer 64 stores an $n+1^{th}$ resultant plurality of encrypted data channels on a corresponding one of the sides thereof during the $n^{th}$ receive frame $F_{Rn}$.

During the $n+1^{th}$ receive frame $F_{Rn+1}$ which immediately follows the first receive frame $F_{Rn}$, the receive burst buffer 64 outputs the $n+1^{th}$ resultant plurality of encrypted data channels from the one side thereof to the fourth exclusive-OR circuit 410 synchronously with the receive crypto bit buffer 416 outputting the $n+1^{th}$ plurality of receive channel units of encryption bits from the corresponding one side thereof to the fourth exclusive-OR circuit 410. The fourth exclusive-OR circuit 410 then outputs to the receive bus an $n+1^{th}$ plurality of clear-text channels of data during $n+1^{th}$ receive frame $F_{Rn+1}$.

Although a specific embodiment of the invention has been disclosed, it will be understood by those of skill in the art that the foregoing and other changes in form and details may be made therein without departing from the spirit and the scope of the invention.

Having thus described our invention, what we claim as new, and desire to secure by Letters Patent is:

1. In a TDMA satellite communications network having a master station and a plurality of subsidiary earth stations, each communicating through a satellite transponder in a plurality of TDMA frames grouped into superframes, each said station including a TDMA communications controller having a plurality of input-/output ports for transferring channels of data from respective, local data users to a TDMA output to said satellite transponder and transferring said channels of data via a TDMA input from said satellite transponder to said respective local users on a time interleaved basis during periodic TDMA frames, an encryption/decryption system for said network, comprising:

a superframe initialization vector generator in said master station, having an output connected to said TDMA output thereof, for transmitting a superframe synchronization vector once during each superframe;

a first encryption engine in each of said stations, having an input connected to said TDMA input thereof, for receiving said superframe synchronization vector and encrypting it with a key, forming a first frame initialization vector prior to a first transmit frame of a transmit superframe, to be used for said first transmit frame;

a frame initialization vector buffer in each of said stations, having an input connected to said first encryption engine, for storing frame initialization vectors output therefrom;

a transmit address array buffer in each of said stations, for storing a plurality of destination addresses, each respectively corresponding to each of said plurality of channels of data to be transmitted;

a first exclusive-OR circuit in each of said stations, having a first input connected to said frame initialization vector buffer and a second input connected to said transmit address array buffer, and an output connected to said input of said first encryption engine, for generating a plurality of channel units of exclusive-OR bits from said first initialization vector and said plurality of destination addresses, each said channel unit corresponding to each of said channels of data to be transmitted;

said first encryption engine receiving each of said plurality of channel units of exclusive-OR bits and encrypting it with a key, forming a corresponding plurality of channel units of encryption bits;

a transmit crypto bit buffer in each of said stations, having an alternate A/B storage cycle, with an input connected to said output of said first encryption engine, and an output, for storing said plurality of channel units of encryption bits on a first side during the transmit frame immediately preceding said first transmit frame;

a second exclusive-OR circuit in each of said stations, having a first input connected to the output of said transmit crypto bit buffer and an output connected to said TDMA output;

a transmit burst buffer in each of said stations having an alternate A/B storage cycle, with a data input connected to a transmit bus common to the data outputs of all of said ports and an output connected to a second input of said second exclusive-OR circuit, for storing, in clear-text form, said plurality of channels of data on a first side during said transmit frame immediately preceding said first transmit frame;

said transmit burst buffer bursting said plurality of clear-text data channels from said first side thereof during said first transmit frame, to said second input of said second exclusive-OR circuit synchronously with said transmit crypto bit buffer bursting said plurality of channel units of encryption bits from said first side thereof to said first input of said second exclusive-OR circuit;

said second exclusive-OR circuit outputting to said TDMA output a resultant plurality of encrypted data channels, each of which is transmitted to said satellite transponder with a corresponding destination address.

2. The encryption/decryption system of claim 1, which further comprises:

said first encryption engine directly encrypting said first frame initialization vector with a key, forming a second frame initialization vector during said first transmit frame, to be used for an immediately succeeding second transmit frame;

said first exclusive-OR circuit generating a second plurality of channel units of exclusive OR bits during said first transmit frame, from said second frame initialization vector and said plurality of destination addresses;

said first encryption engine encrypting said second plurality of channel units of exclusive OR bits with a key, forming a second plurality of channel units of encryption bits during said first transmit frame;

said transmit crypto bit buffer storing said second plurality of channel units of encryption bits on a second side thereof during said first transmit frame;

said transmit burst buffer storing a second plurality of channels of data on a second side thereof during said first transmit frame;

said transmit burst buffer bursting said second plurality of data channels from said second side thereof to said second exclusive-OR circuit during a second transmit frame which immediately succeeds said first transmit frame synchronously with said transmit crypto bit buffer bursting said second plurality of channel units of encryption bits from said second side thereof to said second exclusive-OR circuit;

said second exclusive-OR circuit outputting to said TDMA output a resultant second plurality of encrypted data channels, each of which is transmitted to said satellite transponder with a corresponding destination address.

3. The encryption/decryption system of claim 2, which further comprises:

said first encryption engine directly encrypting an $n^{th}$ frame initialization vector with a key, forming an $n+1^{th}$ frame initialization vector during an $n^{th}$ transmit frame, to be used for an immediately succeeding $n+1^{th}$ transmit frame;

said first exclusive-OR circuit generating an $n+1^{th}$ plurality of channel units of exclusive OR bits during said $n^{th}$ transmit frame, from said $n+1^{th}$ frame initialization vector and said plurality of destination addresses;

said first encryption engine encrypting said n+1$^{th}$ plurality of channel units of exclusive OR bits with a key, forming an n+1$^{th}$ plurality of channel units of encryption bits during said n$^{th}$ transmit frame;

said transmit crypto bit buffer storing said n+1$^{th}$ plurality of channel units of encryption bits on one of said sides thereof during said n$^{th}$ transmit frame;

said transmit burst buffer storing an n+1$^{th}$ plurality of channels of data on a corresponding one of said sides thereof during said n$^{th}$ transmit frame;

said transmit burst buffer bursting said n+1$^{th}$ plurality of data channels from said one side thereof to said second exclusive-OR circuit during said n+1$^{th}$ transmit frame which immediately succeeds said n$^{th}$ transmit frame synchronously with said transmit crypto bit buffer bursting said n+1$^{th}$ plurality of channel units of encryption bits from said corresponding one side thereof to said second exclusive-OR circuit;

said second exclusive-OR circuit outputting to said TDMA output a resultant n+1$^{th}$ plurality of encrypted data channels, each of which is transmitted to said satellite transponder with a corresponding destination address.

4. The encryption/decryption system of claim 1, which further comprises:

a second encryption engine in each of said stations, having an input connected to said TDMA input thereof, for receiving said superframe synchronization vector and encrypting it with a key, forming said first frame initialization vector prior to a first receive frame of a receive superframe, to be used for said first receive frame;

a receive frame initialization vector buffer in each of said stations, having an input connected to said second encryption engine, for storing frame initialization vectors output therefrom;

a receive address array buffer in each of said stations, for storing a plurality of receive destination addresses, each respectively corresponding to each of a plurality of channels of data to be received from said satellite transponder;

a third exclusive-OR circuit in each of said stations, having a first input connected to said receive frame initialization vector buffer and a second input connected to said receive address array buffer, and an output connected to said input of said second encryption engine, for generating a plurality of receive channel units of exclusive OR bits from said first frame initialization vector and said plurality of receive destination addresses, each said receive channel unit corresponding to each of said channels of data to be received from said satellite transponder;

said second encryption engine receiving each of said plurality of receive channel units of exclusive OR bits and encrypting it with a key, forming a corresponding plurality of receive channel units of encryption bits;

a receive crypto bit buffer in each of said stations, having an alternate A/B storage cycle, with an input connected to said output of said second encryption engine, and an output, for storing said plurality of receive channel units of encryption bits on a first side at locations specified by said corresponding destination address, during the receive frame immediately preceding said first receive frame;

a fourth exclusive-OR circuit in each of said stations, having a first input connected to the output of said receive crypto bit buffer and an output connected to a receive bus common to the data inputs of all of said ports;

a receive burst buffer in each of said stations having an alternate A/B storage cycle, with a data input connected to said TDMA input and an output connected to a second input of said fourth exclusive-OR circuit, for storing said resultant plurality of encrypted data channels received from said satellite transponder, on a first side thereof at locations specified by said corresponding destination address, during the receive frame immediately preceding said first receive frame;

said receive burst buffer outputting said resultant plurality of encrypted data channels from said first side thereof during said first receive frame, to said second input of said fourth exclusive-OR circuit synchronously with said receive crypto bit buffer outputting said plurality of receive channel units of encryption bits from said first side thereof to said first input of said fourth exclusive-OR circuit;

said fourth exclusive-OR circuit outputting to said receive bus, said plurality of clear-text channels of data during said first receive frame.

5. The encryption/decryption system of claim 4, which further comprises:

said second encryption engine directly encrypting said first frame initialization vector with a key, forming a second frame initialization vector during said first receive frame, to be used for an immediately succeeding second receive frame;

said third exclusive-OR circuit generating a second plurality of receive channel units of exclusive OR bits during said first receive frame, from said second frame initialization vector and said plurality of receive destination addresses;

said second encryption engine encrypting said second plurality of receive channel units of exclusive OR bits with a key, forming a second plurality of receive channel units of encryption bits during said first receive frame;

said receive crypto bit buffer storing said second plurality of receive channel units of encryption bits on a second side thereof during said first receive frame;

said receive burst buffer storing a second resultant plurality of encrypted data channels on a second side thereof during said first receive frame;

said receive burst buffer outputting said second resultant plurality of encrypted data channels from said second side thereof to said fourth exclusive-OR circuit during a second receive frame which immediately succeeds said first receive frame synchronously with said receive crypto bit buffer outputting said second plurality of receive channel units of encryption bits from said second side thereof to said fourth exclusive-OR circuit;

said fourth exclusive-OR circuit outputting to said receive bus a second plurality of clear-text channels of data during each second receive frame.

6. The encryption/decryption system of claim 5, which further comprises:

said second encryption engine directly encrypting said n$^{th}$ frame initialization vector with a key, forming an $n+1^{th}$ frame initialization vector during an $n^{th}$ receive frame, to be used for an immediately succeeding $n+1^{th}$ receive frame;

said third exclusive-OR circuit generating an $n+1^{th}$ plurality of receive channel units of exclusive OR bits during said $n^{th}$ receive frame, from said $n+1^{th}$ frame initialization vector and said plurality of receive destination addresses;

said second encryption engine encrypting said $n+1^{th}$ plurality of receive channel units of exclusive OR bits with a key, forming an $n+1^{th}$ plurality of receive channel units of encryption bits during said $n^{th}$ receive frame;

said receive crypto bit buffer storing said $n+1^{th}$ plurality of receive channel units of encryption bits on one of said sides thereof during said $n^{th}$ receive frame;

said receive burst buffer storing an $n+1^{th}$ resultant plurality of encrypted data channels on a corresponding one of said sides thereof during said $n^{th}$ receive frame;

said receive burst buffer outputting said $n+1^{th}$ resultant plurality of encrypted data channels from said one side thereof to said fourth exclusive-OR circuit during said $n+1^{th}$ receive frame which immediately succeeds said $n^{th}$ receive frame synchronously with said receive crypto bit buffer outputting said $n+1^{th}$ plurality of receive channel units of encryption bits from said corresponding one side thereof to said fourth exclusive-OR circuit;

said fourth exclusive-OR circuit outputting to said receive bus an $n+1^{th}$ plurality of clear-text channels of data during said $n+1^{th}$ receive frame.

* * * * *